United States Patent [19]
Le Van Suu

[11] Patent Number: 5,497,284
[45] Date of Patent: Mar. 5, 1996

[54] METHOD AND DEVICE FOR THE PROTECTION OF A SERIES BUS AGAINST SHORT CIRCUITS

[75] Inventor: Maurice G. Le Van Suu, Romainville, France

[73] Assignee: SGS-Thomson Microelectronics S.A., Saint-Genis, France

[21] Appl. No.: 197,723

[22] Filed: Feb. 17, 1994

[30] Foreign Application Priority Data

Feb. 18, 1993 [FR] France .................................. 93 01848

[51] Int. Cl.$^6$ ........................................................ H02H 3/00
[52] U.S. Cl. .............................. 361/42; 361/66; 361/86; 370/85.1
[58] Field of Search ............................. 361/42–45, 54–51, 361/59, 60, 61, 63–66, 86, 89, 92; 307/116; 370/85.1

[56] References Cited

U.S. PATENT DOCUMENTS

| 4,406,007 | 9/1982 | Kister et al. .............................. 370/85 |
| 4,752,698 | 6/1988 | Furuyama et al. ....................... 307/116 |
| 5,341,268 | 8/1994 | Ishiguro et al. .......................... 361/62 |

FOREIGN PATENT DOCUMENTS 0049917  4/1982  European Pat. Off. .......... G06F 3/04

OTHER PUBLICATIONS

EDN Electrical Design News, vol. 36, No. 11, 23 May 1991, Newton, MA, "Data line senses remote shorts".

*Primary Examiner*—Todd DeBoer
*Attorney, Agent, or Firm*—David M. Driscoll; James H. Morris; Richard F. Giunta

[57] ABSTRACT

The disclosure relates to the methods and devices that enable series type buses to be protected against the consequences of a short-circuit in the decentralized units connected to this bus. There are provided means to detect the equalization of the potentials of the data wires and means enabling the disconnection, under the control of these detection means, of the decentralized unit responsible for the short circuit. A device is also provided to short circuit the supply wires of the bus according to a predetermined sequence in order to inform the central processing unit of the disconnection of said decentralized unit. The disclosure enables the protection of the central processing unit and of the decentralized units, connected to the bus, that are not malfunctioning.

30 Claims, 2 Drawing Sheets

METHOD AND DEVICE FOR THE PROTECTION OF A SERIES BUS AGAINST SHORT CIRCUITS

BACKGROUND OF THE INVENTION

1. Field of the Invention

The present invention relates to methods that can be used to protect series bus type connection circuits against the consequences of an accidental short circuit occurring on such a bus. It also relates to the devices that can be used to implement such a device.

2. Description of the Prior Art

It is known that, to set up a network of instruments or devices communicating with one another in the field of "smart" buildings, home automation systems, data processing, robotics and automobiles, it is often the practice to use bus type links such that far less attention need be paid to the location of the devices connected to these links. To this end, a set of wires is used, forming a cable that serves the different points at which the communicating devices are likely to be placed, and each communicating device is connected, in a by-pass or branch connection, to these wires by means of a connector enabling the transmission and/or reception of the signals on the wires, including signals pertaining to the supply of the communicating part, Different arrangements, such as a hierarchically organized system for example, enable each device connected to the bus to exchange messages and or information elements of a general nature and to sort out the messages and/or information elements intended for it from all those flowing through the bus, The connectors and the messages and/or information elements sent out in the form of voltage and/or current pulses must meet one or more transmission and reception protocols governed by a certain number of standards designed to enable exchanges among a wide variety of devices that have possibly come, in particular, from different suppliers abiding by the same standard.

The different standards may be classified by category according to different criteria. Thus, there is the known category relating to buses wherein, for example with a series bus, the information flows bit after bit from one piece of equipment to another. This makes it possible then to use a transmission circuit formed by two wires only, known as a "twisted pair".

Given this series transmission, the physical nature of the cable, and the use of a relatively high level of current amounting to some tens of milliamperes to transmit the signals, the transmission speed of such a bus is limited to some Mbits per second. However hand, the equipment used is inexpensive.

In fact, the most commonly used cable comprises four wires, forming what is called a "quad cable" and the remaining two free wires are often used to transmit the supply current for certain devices connected to the bus. Furthermore, the signals are generally transmitted on the two data wires symmetrically with respect to the ground and, in this case, the voltages representing these signals appear as complementary voltages on both wires. These wires are then generally called "DATA" and "(DATA)" (for typographical reasons, brackets are used here instead of the upper bar). When these two data wires are looped by reception circuits having the planned impedance, the same current flows in both wires but in reverse directions, and the signals are therefore complementary as described further above.

It is being planned, at present, to use circuits of this type in applications known such as home automation or computerized domestic applications which include the control of domestic appliances in a dwelling as well as the control of the different accessories of an automobile. In both cases, the links must be provided with a high degree of security, even though the linking circuits to the devices thus connected have to be very moderately priced and are therefore reliable only to a very relative degree, and even though, furthermore, they are subjected to frequently rough environmental conditions and to mishandling by unprofessional users. The installation most usually comprises a central processing unit wherein the essential part of the intelligence of the system is concentrated, and decentralized units corresponding to modular functions working under the control of the central processing unit.

It is a relatively common occurrence that one of these decentralized wires should suffer a malfunction and that this malfunction should cause a short circuit in the data wires. The problem may arise also in the supply wires but it is then easily resolved by a known circuit-breaking device such as a fuse and/or an electronic device.

For the data wires, it is difficult to implement the fuse type of approach and, in this case, the primary consequence of a short circuit is the total interruption of the links between the central processing unit and the other decentralized units and hence a general breakdown of the entire system. Furthermore, if this situation persists, the end result may be that the connection circuits to the bus, which are located in the central processing unit, go out of operation. Indeed, these circuits then let through a high level of current that could amount to several tens of amperes or even more and, even if these circuits include self-protection devices, the problem of locating and reporting the faulty product is not resolved for all that.

SUMMARY OF THE INVENTION

To overcome these drawbacks, the invention proposes a method of protection against the short circuits of a series bus comprising at least two data wires wherein, essentially, the equality or quasi-equality of the potentials on the data wires is detected to determine the state of short circuit of the bus and wherein, on the basis of this information, a decentralized unit responsible for this short circuit is disconnected.

BRIEF DESCRIPTION OF THE DRAWINGS

Other particular features and advantages of the invention shall be seen clearly in the following description, given by way of a non-restrictive example, with reference to the appended figures, of which.

MORE DETAILED DESCRIPTION

Figure 1:
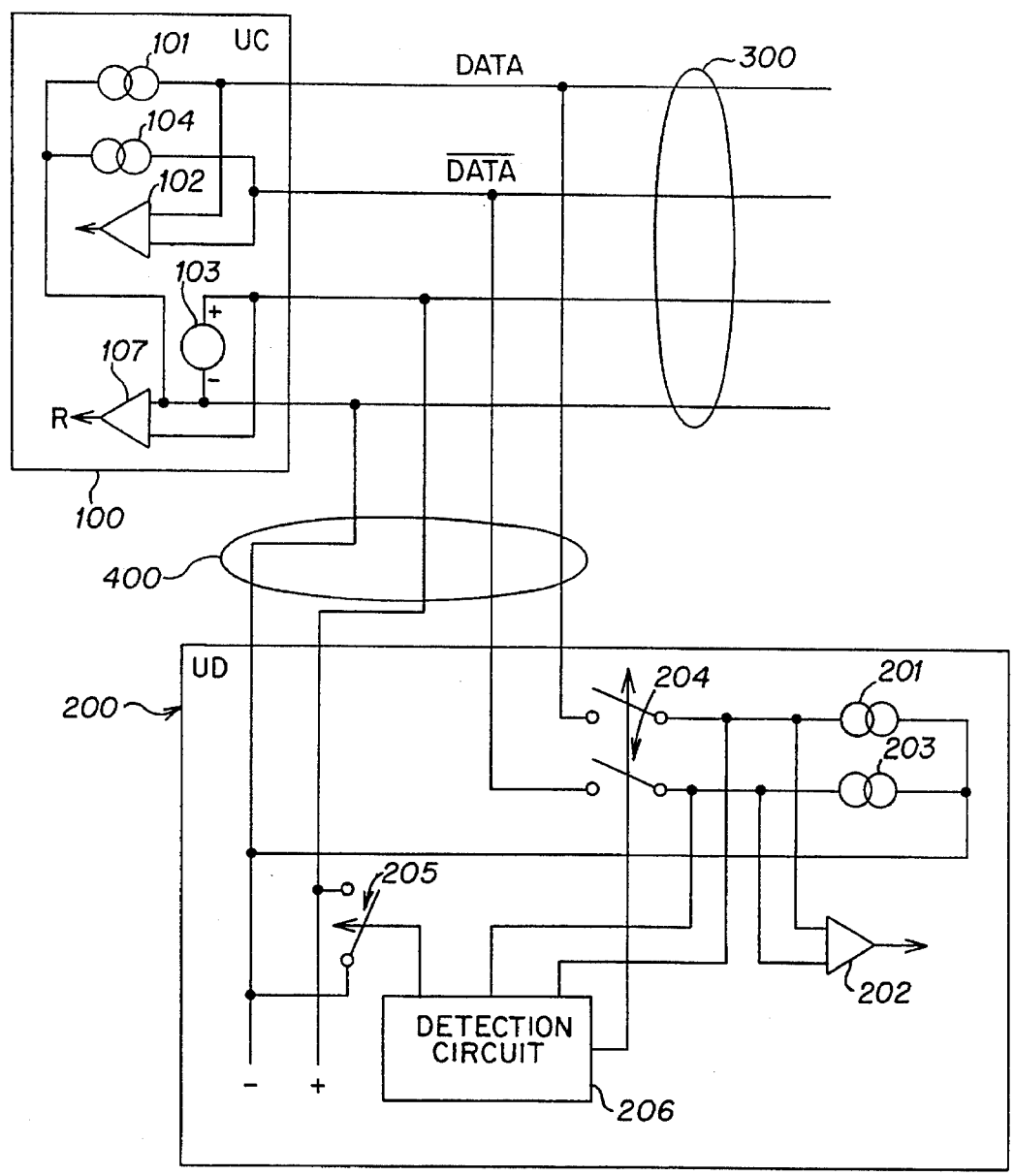
FIG. 1 is a diagram of a communicating system comprising a central processing unit and a decentralized unit connected by a series bus.

The system shown in FIG. 1 comprises a central processing unit 100 called UC and a decentralized unit 200, called UD, linked together by a series bus 300 to which the decentralized unit is connected in a by-pass or branch connection by means of connections 400.

In a known way, the two wires DATA and (DATA) of the bus 300 are connected in the central processing unit, firstly to two current sources 101 and 104 controlled by the signals to be sent (1 and 0) on the bus towards decentralized units such as 200 and, secondly, to a differential amplifier 102 enabling the detection of the signals present on the bus and coming, in particular, from the decentralized unit 200. These sources and this receiver schematically represent the means for the transmission and reception of the signals of the UC, as well as those of the UD which are described further below.

The central processing unit also comprises a voltage source 103 sending out a supply voltage on the other two wires of the bus, this supply voltage being intended for at least one of the decentralized units, the UD 200 for example.

The supply wires are connected inside the decentralized unit 200, in a manner that is not shown here, to the circuits that need to be supplied by this means.

In the UD 200, the two data wires are connected, in a known way, firstly to a differential amplifier 202 that enables the detection of the signals sent by the current sources 101 and 104 and, secondly, to two controlled current sources 201 and 203 that enable the sending, to the bus, of the signals intended for the central processing unit or, if necessary, for other decentralized units.

According to the invention, a detector 206 is connected in parallel to the two connections coming from the data wires of the bus and it enables the detection of a short circuit, if any, in these data wires. This detection of a short circuit is achieved by the observing of a voltage drop that this detector causes between these wires and that may lead to the equality of their potentials. This detector 206 then makes it possible to control first of all connection means 204 that enable the current sources 201 and 203 and the amplifier 202 to be insulated from the connection wires 400 providing for connection to the data wires of the bus 300.

According to another characteristic of the invention, the decentralized unit also comprises short-circuiting means 205 enabling the short-circuiting, under the control of the detection circuit 206, of the connection wires 400 providing for connection to the supply wires of the bus 300.

The disconnection means 204 and the short-circuiting means 205 have been shown in the form of electromagnetic relays but they could, of course, be constituted by any other means enabling the same result to be obtained, especially semiconductor devices.

According to the invention, therefore, when the detection circuit 206 detects the short-circuiting of the data wires of the bus 300, it first of all activates the working of the disconnection means 204 which then insulate the current sources 201 and 203 and the amplifier 202.

It may be noted that, at this stage, it is not possible, at least in this exemplary embodiment, to know the place at which the short circuit has occurred. This short circuit could equally well be located in another decentralized unit or even in the bus. The detector circuit 206 is bound to the data bus, either downstream to the connection means 204 (as shown on FIG. 1) or upstream, or even on both sides. Accordingly logical orders to be sent are adapted. Hence, for the connection type shown on FIG. 1, if the short circuit persists after the reception and transmission circuits of the decentralized units 200 have been disconnected by the circuit 204, it means that this unit is implicated. The detection circuit 206 then activates accordingly the means 204 to disconnect definitively the circuits from the decentralized unit 200. If the circuit 206 is connected upstream to the means 204, inverse orders are sent.

It is possible, however, to have a situation in which several decentralized units, or even all of them, get disconnected in a way that is sufficiently simultaneous so that they all seem to be malfunctioning whereas only one of them is concerned. To avert this risk, provision may be made for a certain time lag, of the order of some milliseconds for example, in the disconnection, in seeing to it that the durations of these time lags are distributed randomly, this being done for example during the manufacture of the decentralized units. Thus, each unit will get disconnected in turn and get reconnected if the short circuit has disappeared during its disconnection. The risks of simultaneous disconnection of a large number of decentralized units will thus be easily reduced, and most usually it is only the concerned unit that will remain disconnected.

With the concerned decentralized unit being thus disconnected, it is often preferable to report this disconnection to the central processing unit 100. Now, since the systems that use such a bus generally have to be inexpensive, they are often simplified to the maximum extent and the placing of a transmitter and a receiver simultaneously in the decentralized units is avoided where unnecessary. Thus a decentralized unit designed solely to carry out commands will often have no transmitter and will not be able to send any acknowledgment of the commands received. Conversely, a decentralized unit that is designed solely to act as a sensor will often have no receiver and therefore will not be able to be interrogated at regular intervals by the central processing unit with a view to ascertaining that it is in good condition, as is often done in more elaborate but more expensive systems.

Hence, to transmit the information that the decentralized unit is out of order to the central processing unit, the invention proposes the short-circuiting of the electrical supply wires of the bus, temporarily and according to a code determined in advance, this short-circuiting being done by the use of a short-circuiting means such as the relay 205 shown in the figure. This action is carried out under the control of the detector 206.

For example, it is possible to provide for two short-circuiting square-wave pulses with a period or duration d equal to 1 μs separated by an interval with a period or duration D equal to 100 μs. Such a duration enables the transmission of an easily detectable signal to the central processing unit without, however, any risk of causing deterioration in the supply circuits contained in this central processing unit or of prompting the functioning of protection circuits such as fuses.

The central processing unit will therefore comprise a detection circuit formed, for example, by a differential amplifier 107 connected to the terminals of the current source 103. This circuit will detect the potential drop at the terminals of the source 103 and will deliver a signal R informing the logic circuits (not shown) of the central processing unit about the state of disconnection of the decentralized unit 200.

To prevent any false detection, due for example to transient phenomena prompted by the operation of the decentralized units, the signals applied to the amplifier 107 may be filtered so as to discriminate these 1 μs pulses. Similarly, to determine the specific decentralized unit that is disconnected, it is possible to provide for encoding the sequence of the pulses, for example by modifying the duration D between them, each duration being characteristic of a particular decentralized unit.

By way of an improvement, it is possible to provide for the repeating of the signal thus sent at regular intervals so that, if it has not been taken into account at the time of the disconnection, it is taken into account during one of the subsequent repetitions. This is particularly useful in applications of the home automation type where it is desired to have supervision of the decentralized units, without this supervision being necessarily very frequent. It is also possible to provide for the repetition of the warning signal, for example every thirty minutes or every hour.

Figure 2:
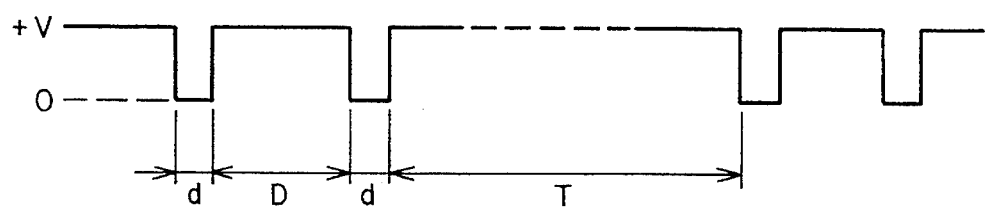
FIG. 2 is a graph of the signals on the supply wires of the bus.

The signalling from the decentralized unit to the central processing unit will therefore take the form, in this example, of a modulation of the supply voltage +V shown in FIG. 2 which shows the two square-wave pulses with a duration d separated by a duration D and repeated at time intervals T.

Figure 3:
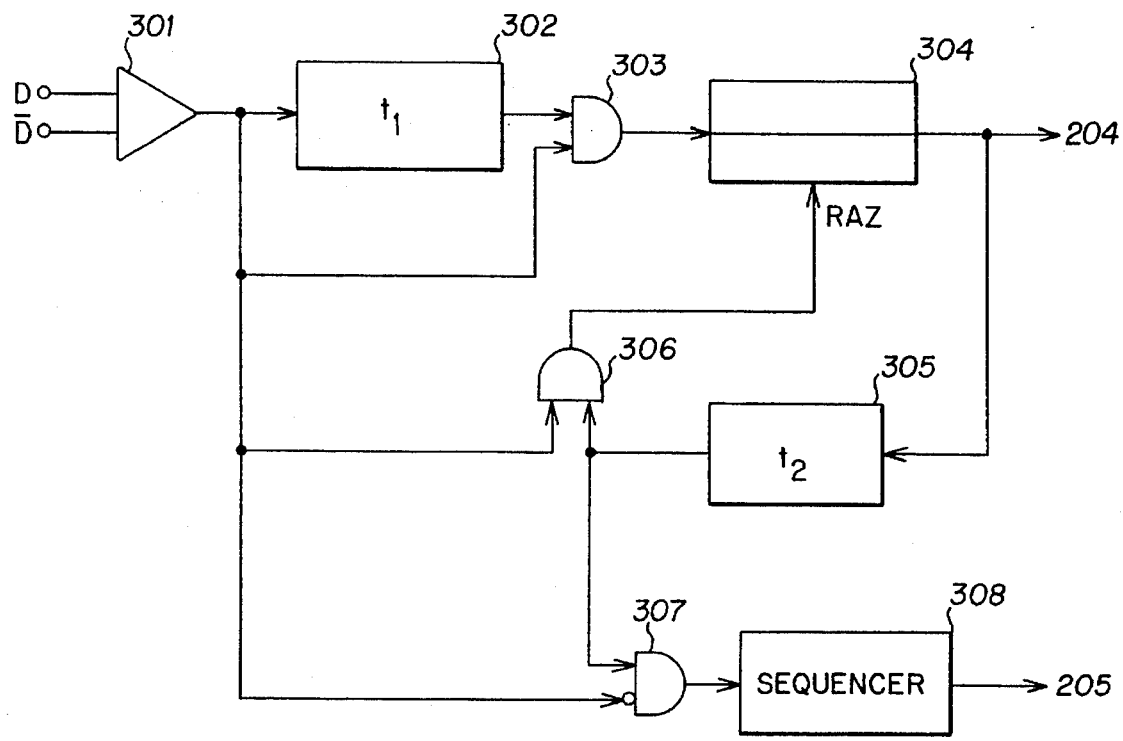
FIG. 3 is a diagram of the protection elements according to the invention contained in the decentralized unit.

The circuit 206 may be formed, for example, as shown schematically in FIG. 3.

The data wires of the bus D and (D) are connected to a differential amplifier 301 which is set in such a way that it sends out a signal when the potentials on these two wires reach values which, in principle, are identical and, in practice, are close to each other only to an extent sufficient to enable the detection of a short circuit that is not clearly a short circuit.

This signal is delayed by a duration t1 by means of a first delay circuit 302, the output of which is applied to an AND gate 303. This AND gate also receives the output signal from the amplifier 301. There is therefore an output signal from this gate 303 only if the short circuit has persisted for the duration t1, i.e. if no other decentralized unit has been disconnected in the meantime.

The output signal from this gate 303 then causes the flipping over of a flip-flop circuit 304, the output of which sends a command signal to the relay 204 which then disconnects the decentralized unit. This command signal is furthermore delayed by a second delay circuit 305 by a duration t2 that is sufficient to let the relay 204 function and to let the potentials on the wires D and (D) return to their normal values.

If, at the end of this duration t2, the situation is restored on the wires D and (D), it means that it is another decentralized unit that has gone into short-circuit. To take account of this fact, the outputs of the amplifier 301 and of the delay circuit 305 are furthermore connected to a second AND gate 306 whose output is itself connected to a zero-setting input RAZ of the flip-flop circuit 304. Hence, if the previous condition, which shows that it is another decentralized unit that is defective, is fulfilled, then the gate 306 resets the flip-flop circuit 304 at zero and this flip-flop circuit restores the connection of the decentralized unit to the bus by means of the relay 204.

If, on the contrary, at the end of this duration t2, the situation remains abnormal, the flip-flop 304 remains in its state of activating the opening of the relay 204, and the signal of the delay circuit 305 is applied to a first direct input of a third AND gate 307 which receives the output signal of the amplifier 301 at another input which, for its part, is an inverter input. Under these conditions, the output of this gate 307 commands the working of a sequencer 308 only if the decentralized unit is truly faulty and disconnected. The output of this sequencer then controls the short-circuiting relay 205 according to a sequence corresponding, for example, to that of FIG. 2. A sequencer 308 of this type is a circuit that is commonly available in the market and is used to give a sequence of logic states separated by programmable durations as required.

The detection circuit 107 enabling the detection, in the central processing unit, of the short-circuit signal arriving on the supply wires, should be capable of following the brief signals of the type shown in FIG. 2, and should preferably deliver a signal corresponding to logic states that can be used directly by the microprocessor type information processing units contained in the central processing unit 100.

Figure 4:
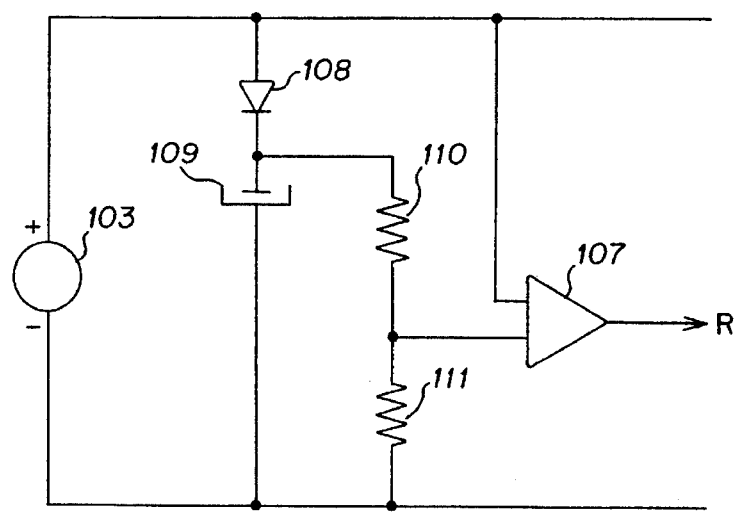
FIG. 4 is a diagram of the protection elements according to the invention contained in the central processing unit.

For this purpose it is possible to use, for example, a circuit of the type shown schematically in FIG. 4.

This circuit comprises a differential amplifier 107 that can be configures, if necessary, as a Schmidt trigger and that has its output voltage limited to the logic level of the circuits that will use this output signal R.

The + input of this amplifier is connected to the positive supply wire.

A diode 108 connected to this same positive wire charges a high-capacitance capacitor 109 furthermore connected to the - supply wire. This enables the keeping, at the terminals of this capacitor, of a potential that is substantially equal to that of the supply during the brief instants when the supply wires are short-circuited by the relay 205.

A bridge formed by two resistors 110 and 111 in series, between the point common to the diode and to the capacitor and the negative wire of the supply, is used to obtain a threshold voltage that is equal, for example, to a quarter of the normal value of the supply voltage. This threshold will be considered to be the critical value below which the supply wires may be considered to be short-circuited by the relay 205.

When the voltage on the positive wire falls below the value of this threshold, the amplifier 107 flips over and the potential at its output goes from one logic state to another, in this case from a high logic state to a low logic state. This constitutes the output signal R. This signal is then applied to known type decoding means which will determine the specific duration and sequence of the interruptions of supply due to the short-circuiting by the relay 205.

The central processing unit thus informed of the disconnection of the decentralized unit will then trigger the measurements, planned in another context, that do not form part of the invention.

What is claimed is:

1. A method for the protection of a series bus against short circuits, comprising the steps of:

detecting a short circuit condition, between at least two data wires within the series bus, wherein the series bus interconnects a centralized processing unit and at least one decentralized processing unit; and disconnecting, responsive to the step of detecting, a decentralized unit containing the short circuit condition.

2. The method according to claim 1 wherein the bus further includes two supply wires, and the method further comprises the step of:

temporarily short-circuiting the supply wires of the bus to report a state of disconnection of the decentralized unit containing the short circuit condition.

3. The method according to claim 2, wherein the step of short circuiting the supply wires includes delivering a burst of at least two short circuiting pulses, each pulse lasting for a first duration, and a time between the pulses lasting for a second duration, the second duration being substantially longer than the first duration.

4. The method according to claim 3, wherein the step of short-circuiting the supply wires further comprises:

repeating the step of delivering the burst at the end of a third duration, the third duration being substantially longer than the second duration whether it contains the short circuit; and 5. The method according to claim 1, wherein the at least one decentralized processing unit includes a plurality of decentralized processing units, and the step of disconnecting further comprises:

isolating one of the plurality of decentralized processing units from the series bus after a predetermined time lag;

testing the isolated one of the plurality of decentralized processing units to determine whether it contains the short circuit; and reconnecting the isolated one of the plurality of decentralized processing units, responsive to a determination by the step of testing that the one of the plurality of decentralized processing units does not contain the short circuit.

6. The method according to claim 5, further comprising repeating the steps of isolating, testing, and reconnecting for different ones of the plurality of decentralized processing units, wherein different decentralized processing units are isolated from the series bus in the step of isolating after different predetermined time lags.

7. A method for protecting a bus against a short circuit, comprising, by a decentralized device on the bus, the steps of:

monitoring a pair of data conductors conveyed by the bus to determine whether a short circuit has occurred between the pair of data conductors;

disconnecting, responsive to a detection of a short circuit, at least one of the data conductors of the pair of data conductors;

determining whether the short circuit disappears after the step of disconnecting; and reconnecting the at least one data conductor, responsive to a determination by the step of determining that the short circuit disappears.

8. The method of claim 7, wherein the at least one of the data conductors is left disconnected responsive to a determination by the step of determining that the short circuit does not disappear.

9. The method of claim 8, wherein the step of monitoring includes observing a voltage drop between the pair of data conductors and generating a first binary signal indicative of whether a short circuit is present.

10. The method of claim 9, wherein the step of monitoring further includes:

delaying the first binary signal by a first delay period to generate a second binary signal; and comparing the first binary signal to the second binary signal to generate a third binary signal indicative of whether the short circuit persists after an expiration of the first delay period.

11. The method of claim 11, wherein the step of disconnecting further comprises:

storing, responsive to the third binary signal indicating that a short circuit persists, a value in a memory device to generate a fourth binary signal; and opening a switch, responsive to the fourth binary signal, to isolate the at least one data conductor from the decentralized device.

12. The method of claim 11, wherein the step of determining whether the short circuit disappears after the step of disconnecting further comprises:

delaying the fourth binary signal by a second delay period to generate a fifth binary signal; and comparing the first binary signal to the fifth binary signal to generate a sixth binary signal indicative of whether the short circuit persists;

13. The method of claim 12, wherein the step of reconnecting the at least one data conductor further comprises:

clearing the memory device to change the state of the fourth signal so that the switch closes and reconnects the at least one data conductor.

14. The method of claim 7, further comprising the step of the decentralized device generating a warning signal, responsive to the short circuit disappearing after the step of disconnecting, to identify the decentralized device as a source of the short circuit.

15. The method of claim 14, further comprising repeating the warning signal at regular intervals.

16. The method of claim 14, wherein the step of generating the warning signal further comprises short circuiting at least one power conductor on the bus to another conductor of the bus.

17. The method of claim 16, wherein the bus includes two power conductors, and step of generating the warning signal includes short circuiting the two power conductors.

18. The method of claim 17, wherein the step of short circuiting includes connecting the two power conductors together for a first interval of time, and repeating connecting the power conductors after a second interval of time, the first interval being substantially shorter than the second interval.

19. The method of claim 17, wherein the step of signaling includes generating a sequence of short circuiting pulses between the two power conductors that is characteristic of the decentralized device and is distinct from sequences generated by other decentralized devices.

20. The method of claim 7, wherein the bus includes two power conductors, and further comprising the step of the decentralized device generating a warning signal, responsive to the short circuit disappearing after the step of disconnecting, to identify the decentralized device as a source of the short circuit, including generating a sequence of short circuiting pulses between the two power conductors that is characteristic of the decentralized device and is distinct from sequences generated by other decentralized devices.

21. In a system having a plurality of decentralized devices connected together by a bus, an apparatus for protecting the bus against short circuits, comprising, within at least one decentralized device:

means for detecting a short circuit between a pair of data conductors conveyed by the bus;

means for disconnecting the pair of data conductors from the decentralized device;

means for determining whether the short circuit disappears after the pair of data conductors are disconnected; and means for reconnecting the pair of data conductors, responsive to the means for determining indicating that the short circuit disappeared.

22. The apparatus of claim 21, further comprising means, responsive to the means for determining indicating that the short circuit does not disappear, for generating a signal on the bus identifying the decentralized device as a source of the short circuit.

23. The apparatus of claim 22, wherein the means for generating a signal identifying the decentralized device includes sequencing means for generating a sequence of short circuiting pulses on a power supply conductor on the bus.

24. The apparatus of claim 23, wherein the sequencing means includes connecting means for connecting the power supply conductor to another conductor on the bus.

25. The apparatus of claim 24, wherein the bus includes two data conductors and two power supply conductors, and the means for connecting connects together the two power supply conductors.

26. In a system having a plurality of decentralized devices connected together by a bus, an apparatus for protecting the bus against short circuits, comprising, within a decentralized device:

a detector coupled to a pair of data conductors within the bus that generates a first binary signal indicative of whether there is a short circuit between the pair of data conductors;

a memory device, having a setting input, a resetting input, and an output, the setting input being coupled to the first binary signal, the memory device generating a second binary signal at the output responsive to a state of the first binary signal;

a first switch, coupling the pair of data conductors to the decentralized device, that alternately opens and closes responsive to the second binary signal;

a first delay circuit that delays the second binary signal and generates a third binary signal; and a logic circuit, receiving the first binary signal and the third binary signal, that generates a fourth binary signal, the fourth binary signal coupling to the resetting input of the memory device.

27. The apparatus of claim 26, wherein the detector further comprises:

a differential amplifier, coupled to the pair of data conductors, that generates a fifth binary signal;

a second delay circuit, that receives the fifth binary signal and generates a sixth binary signal delayed in time from the fifth binary signal by a second delay period; and an AND gate circuit that receives the fifth and the sixth binary signals, and that generates the first binary signal, so that the first binary signal is prevented from activating for short circuits lasting less time than the second delay period.

28. The apparatus of claim 27, wherein the first delay circuit delays the second binary signal by a first delay period, the first delay period being of a sufficient duration to allow the switch to open and the pair of data conductors to settle to a new state after the switch is opened.

29. The apparatus of claim 26, further comprising a sequencing circuit that generates, responsive to a state of the first and third binary signals, a sequencing binary signal indicative of an identity of the decentralized device.

30. The apparatus of claim 26, further comprising a second switch, coupled to a pair of power supply conductors on the bus, that alternately opens and closes to short circuit the pair of power supply conductors, in response to the sequencing binary signal.

* * * * *

UNITED STATES PATENT AND TRADEMARK OFFICE
CERTIFICATE OF CORRECTION

PATENT NO. : 5,497,284
DATED : March 5, 1996
INVENTOR(S) : Maurice G. Le Van Suu It is certified that error appears in the above-indentified patent and that said Letters Patent is hereby corrected as shown below:

On the Title page, item [73]

Assignee: SGS-Thomson Microelectronics, S.A.
Saint Genis, Pouilly, France

Signed and Sealed this

Twenty-first Day of May, 1996

Attest:

BRUCE LEHMAN

*Attesting Officer*    Commissioner of Patents and Trademarks